United States Patent [19]

Diebel et al.

[11] 4,200,703

[45] Apr. 29, 1980

[54] PROCESS FOR THE MANUFACTURE OF HEAT-STABLE, NUCLEAR-BROMINATED POLYSTYRENES

[75] Inventors: Klaus Diebel; Horst-Dieter Wulf; Raban Grundmann; Gunther Maahs, all of Marl, Fed. Rep. of Germany

[73] Assignee: Chemische Werke Huls A.G., Marl, Fed. Rep. of Germany

[21] Appl. No.: 617

[22] Filed: Jan. 2, 1979

[30] Foreign Application Priority Data

Jan. 2, 1978 [DE] Fed. Rep. of Germany ....... 2800012
Jan. 2, 1978 [DE] Fed. Rep. of Germany ....... 2800013

[51] Int. Cl.² ............................ C08F 8/20; C08F 8/22
[52] U.S. Cl. ..................................... 525/357; 525/358
[58] Field of Search ..................... 526/44, 45; 525/357, 525/358

[56] References Cited

U.S. PATENT DOCUMENTS

| 3,039,977 | 6/1962 | Ingram | 526/45 |
| 3,050,476 | 8/1962 | Tress et al. | 526/45 |
| 4,074,032 | 2/1978 | Naarmann et al. | 526/44 |
| 4,143,221 | 3/1979 | Naarmann | 525/357 |

OTHER PUBLICATIONS

Rubber Age–Molecular Weight Jump Reaction; Dec. 1964; pp. 410–415.
Friedel–Crafts and Related Reactions; 1963; Olah; Interscience; pp. 206, 242, 243, 259.

*Primary Examiner*—William F. Hamrock
*Attorney, Agent, or Firm*—Millen & White

[57] ABSTRACT

In a process for the manufacture of a heat-stable, nuclear-brominated polystyrene by brominating, at $-20°$ C. to $+40°$ C., a polystyrene dissolved in a chlorinated hydrocarbon in the presence of a Lewis acid catalyst, an improvement is provided wherein the catalyst further comprises 0.02 to 2 moles, per mole of Lewis acid, of a nucleophilic substance which acts as a Lewis base for the Lewis acid.

7 Claims, 1 Drawing Figure

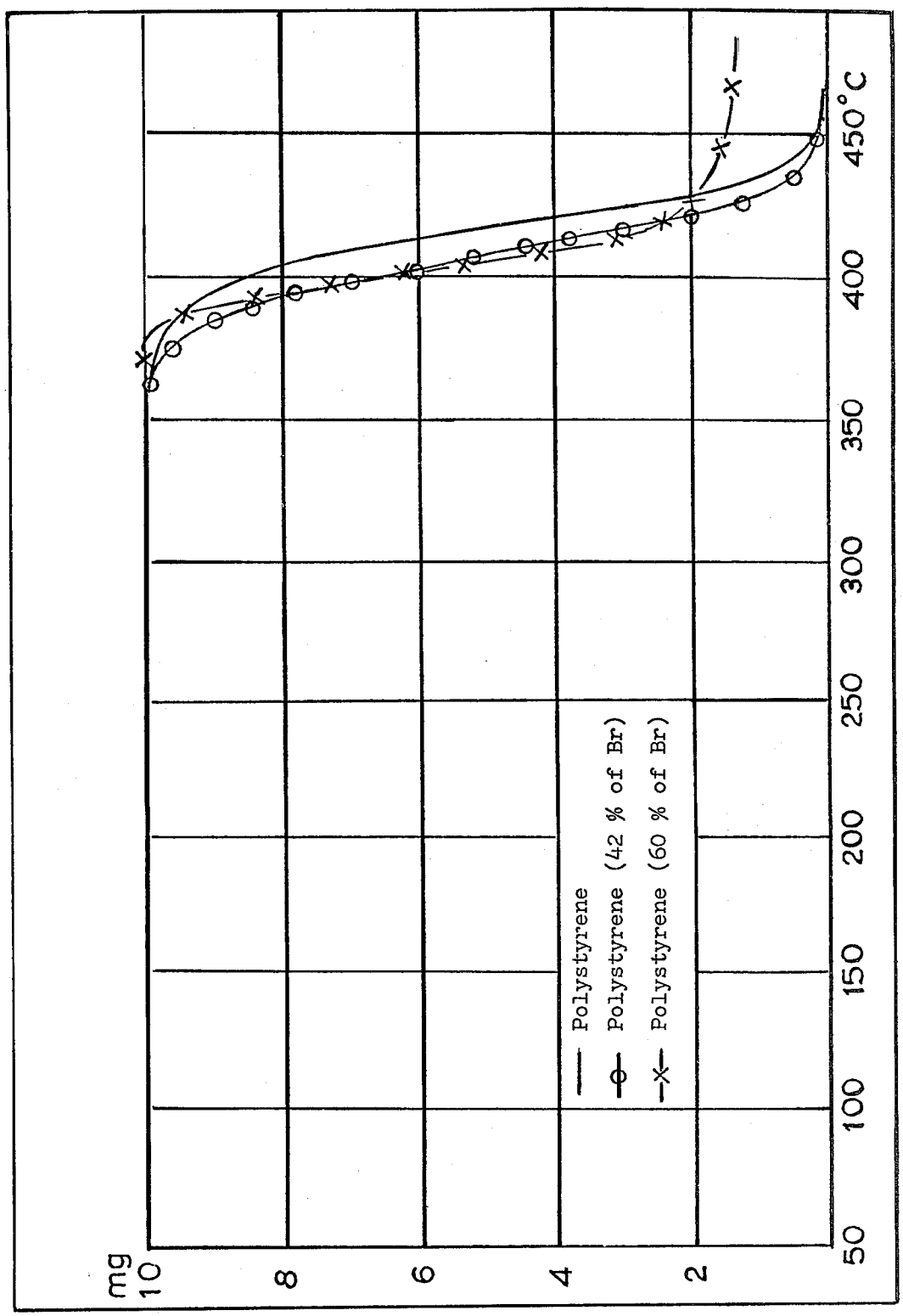

PROCESS FOR THE MANUFACTURE OF HEAT-STABLE, NUCLEAR-BROMINATED POLYSTYRENES

BACKGROUND OF THE INVENTION

The nuclear bromination of polystyrene has been the subject of many patent applications and other publications. Summaries of some of this work can be found, for example, in Houben-Weyl, volume XIV/2, 680 or in H. Vogel, "Flammfestmachen von Kunststoffen" (Flameproofing of Plastics"), A. Hüthig Verlag (1966), 66 to 67. A common feature of all of the procedures described in these publications is that some of the aliphatically bonded hydrogen atoms are also replaced by halogen during the bromination. As a result, such products cannot be used for a number of applications, since they split off hydrogen bromide at temperatures of only about 200° to 250° C. Even when they contain only very small amounts of aliphatically bonded bromine, they develop a dark discoloration at temperatures above 200° C.

German Auslegeschrift 2,537,385 (U.S. Pat. No. 4,074,032) describes a process for the bromination of hydrogenated oligomeric styrenes, by which nuclear bromination products are obtained which are heat-stable up to 320° C. Such oligostyrenes have a molecular weight of 400 to 8,000. However, it is desired to have available nuclear-brominated, heat-stable polystyrenes of customarily used higher molecular weights. These are desired, inter alia, since, because of their lower solubility and volatility, improved physiological characteristics can be expected with these polymers. This is important, for example, for the production of plastics with a flameproof finish. Moreover, the fact that the oligomeric styrenes have to be hydrogenated prior to bromination by this process, which is in itself known and is carried out with conventional agents, must also be regarded as a disadvantage. Furthermore, as can be seen from all of the examples of this reference, the stability is partly achieved by adding specific phosphites.

Since it has hitherto not been possible to manufacture nuclear-brominated, heat-stable polystyrenes by bromination, it has been proposed (see German Auslegeschrift No. 1,544,694, column 1, lines 63 to 67), to use poly-(tri-bromostyrene) which has been manufacture by polymerization of tribromostyrene. This manufacturing process is, however, industrially disadvantageous, since both the synthesis of tribromostyrene and the polymerization thereof are expensive processes.

SUMMARY OF THE INVENTION

Thus, it is an object of the present invention to provide a process for brominating the aromatic nuclei of polystyrene in a simple manner, without the need for special measures and/or additives, to give heat-stable products.

Upon further study of the specification and appended claims, further objects and advantages of this invention will become apparent to those skilled in the art.

These objects have been achieved by providing in a process for the manufacture of a heat-stable, nuclear-brominated polystyrene by brominating, at −20° C. to +40° C., a polystyrene dissolved in a chlorinated hydrocarbon, in the presence of a Lewis acid catalyst, the improvement wherein the catalyst further comprises 0.02 to 2 moles per mole of Lewis acid of a nucleophilic substance which acts as a Lewis base for the Lewis acid.

BRIEF DESCRIPTION OF THE DRAWING

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1 shows the thermogravimetric characteristics of two brominated polystyrenes of this invention and of polystyrene.

DETAILED DISCUSSION

The process of this invention is surprising because German Auslegeschrift No. 2,537,385 shows, in its comparison example, that a polystyrene with a molecular weight of 100,000 will be completely cross-linked under the bromination conditions claimed therein. Moreover, the rise in viscosity due to cross-linking is confirmed when this example is repeated and also when the prior art method is applied to a polystyrene having a molecular weight of 200,000. In view of these facts, it is, therefore, not only surprising that it is possible to brominate conventional polystyrenes at all to give heat-stable products, but also that this can be carried out without difficulty using the conventional agents and conditions as long as these are modified in accordance with this invention.

The advantageous use in this invention of a catalyst of a Lewis acid in combination with a nucleophilic substance is further unobvious in view of the disclosure of German Auslegeschrift No. 2,537,385, since the latter mentions a number of the many known Lewis acids as examples of substances which can be used in the conventional process; but, in the illustrative examples, only aluminum chloride is used, and, moreover, of course, it is as anhydrous as possible. From this, it could never be expected that a successful reaction would ensue directly when a Lewis acid in general is used in accordance with this invention, in combination with a nucleophilic compound.

Furthermore, it is known from *Friedel-Crafts and Related Reactions,* G.A. Olah, Interscience Publishers, New York 1963, pages 206, 242, that Lewis acids display varying activities and that their activities can be affected by the solvent used. However, it could not be foreseen that the activity of a Lewis acid could be controllably set in accordance with this invention such that the polystyrene would not be cross-linked, and yet, simultaneously, its phenyl residues would still be halogenated at a satisfactory reaction velocity (loc. cit., p. 859).

Suitable polystyrenes for bromination in accordance with this invention include, in particular, homopolystyrenes with a molecular weight of 50,000 to 500,000 (weight-average). More particularly, the reaction can be carried out well with polymers having a molecular weight of 150,000 to 250,000. However, the reaction also is applicable to known copolymers of styrene with butadiene, isoprene or α-methylstyrene if all double bonds introduced by the comonomer are removed beforehand by hydrogenation. Polymers of styrene, which possess alkyl groups or halogen substituents, can also be used in the bromination, for example, polyvinyltoluene or poly(monobromostyrene). These polystyrenes can also be conventionally compounded products, but these should contain as small as possible a proportion of conventional additives such as lubricants, stabilizers, fillers, etc.

This invention in general is applicable to polystyrenes having any molecular weight, e.g., greater than 8,000. For polystyrenes of lower molecular weights, this invention is also applicable and is unobvious as applied thereto for the reasons mentioned above.

In general, suitable catalysts include the conventional Lewis acids, e.g., of the $AlCl_3$, $AlBr_3$, $FeCl_3$, $FeBr_3$, Fe, $SbCl_5$, $BF_3$, $TiCl_4$, $SnCl_4$, $ZnCl_2$, $CaBr_2$, $CuBr$ or $I_2$ type; the aluminum halides and iron halides, especially $FeCl_3$ and $AlCl_3$, being preferred. The catalyst is generally employed in amounts of 2 to 100 g, preferably 10 to 40 g, per 1 kg of polystyrene to be brominated.

In order to avoid cross-linking, the catalyst is modified according to this invention by adding a small amount of a nucleophilic substance (i.e., a Lewis base) which enters into an acid/base equilibrium with the Lewis acid. As a rule, such a substance is a compound which has one or more free electron pairs through which it forms an association complex with the electron acceptor (Lewis acid). Bases of this type can be either inorganic, such as $H_2O$, $H_2S$, $NH_3$, $PCl_3$, $PBr_3$, $SO_2$ or $SCl_4$, or organic, for example, alcohols, such as methanol, ethanol or glycol; ethers, such as diethyl ether, methyl butyl ether or dioxane; esters, such as ethyl acetate or ethyl formate; amides, such as dimethylformamide or ethylacetamide; carboxylic acids, such as acetic acid, oxalic acid or benzoic acid; acid chlorides, such as acetyl chloride or benzoyl chloride; ketones, such as benzophenone; aldehydes, such as chloral or benzaldehyde; amines, such as amylamine or piperidine; nitriles, such as acetonitrile or butyronitrile; nitro compounds, such as nitromethane or nitrobenzene; or pyridine and thiophene. These examples are only meant to be illustrative of compounds which satisfy the principles of a Lewis base as mentioned above, and do not represent a complete list of the manifold possibilities for such modifiers.

In addition to achieving the modification according to this invention, the use of such a nucleophilic substance when brominating polystyrene is also advantageous in that the solubility of the Lewis acid in the chlorinated hydrocarbon is substantially improved. As a result, the reaction proceeds in a homogeneous phase and can be carried out in an especially optimum manner when the particularly preferred mixed ratios mentioned below are used.

Because of technical simplicity, water is preferred as the nucleophilic additive, especially for the manufacture of the brominated polystyrenes at temperatures of 10° to 20° C. However, it can also be advantageous, for brominations which are carried out at a low temperature (e.g., $-10°$ to $-20°$ C.), in order to obtain particularly light colored products, to employ a substance which has a lower basicity than water, for example methanol or nitrobenzene, in order to achieve a good rate of reaction.

The amount of nucleophilic substance to be added in general is 0.02 to 2 moles per 1 mole of Lewis acid. Preferably, 0.05 to 1 mole is used. Optimum amounts for particular systems have proved to be 0.4 to 0.8 mole of water per mole of Lewis acid catalyst $AlCl_3$ and 0.05 to 0.2 mole of water per mole of Lewis acid $FeCl_3$. Optimum amounts for other combinations of the Lewis acids and bases can be determined by routine experimentation, of course. Amounts greater than 2 moles of the nucleophilic additive can equivalently be used without difficulty, but such larger amounts add no advantages in carrying out the reaction.

The chlorinated hydrocarbons suitable for use as solvents should, on the one hand, have good solvent power for the polystyrenes but, on the other hand, should not react, or should react only with difficulty, with bromine, chlorine or hydrogen bromide. These conditions are met, for example, by methylene chloride, 1,2-dichloroethane, chloroform, carbon tetrachloride, methylene bromide, 1,2-dibromoethane, 1,1,2-trichloroethane, 1,1,2,2-tetrachloroethane and trichlorobenzene. In addition to other advantages, methylene chloride has a particularly low tendency to react with aromatic compounds in the presence of a Lewis acid; it, therefore, enables chlorine-free products to be manufactured and is preferred for this reason.

The reaction is carried out using solutions of the polystyrene in the solvent which contain 3 to 25, preferably 5 to 20 and especially 10 to 15% by weight of the polystyrene.

The bromination according to the invention proceeds well at temperatures of $-20°$ to $+40°$ C. Above 40° C., substitutions on aliphatic carbon atoms occur to an increasing extent. The electrophilic nuclear substitution can also be carried out below $-20°$ C., and, thus, such reactions are equivalently a part of this invention, but the rate of reaction is too low for carrying out the reaction in practice industrially.

The calculated amount of bromine is usually metered directly into the catalyst-containing polystyrene solution. Dilution of the bromine with a solvent such as methylene chloride, chloroform or dibromoethane is also possible. Since the reaction proceeds rapidly, it can be conducted continuously, with mixing of meterable streams of polystyrene solution and bromine in a suitable reaction zone. By using bromine chloride or by subsequent oxidation of the HBr formed to $Br_2$ using chlorine, hydrogen peroxide or other oxidizing agents, virtually all of the bromine employed can be utilized for the desired aromatic substitution. When bromine and chlorine are used at the same time, partial chlorination of the polystyrene can also occur. However, for aromatically bonded chlorine contents of less than 20%, this exerts no negative influence on the end products.

0.1 to 3 moles of bromine or, in the case where the produced HBr is reoxidized, 0.05 to 1.5 moles of bromine are employed per mole of the styrene monomer. 3.2 kg of bromine or in the case of reoxidation, 1.6 kg of bromine, per 1 kg of polystyrene are preferred.

After the reaction has ended, the catalyst is deactivated by adding water and is washed out together with HBr or HCl. If residual amounts of bromine are present, a reducing agent such as, for example, $Na_2S_2O_3$ or $NaHSO_3$ is added to the water. Washing steps using dilute sodium carbonate solution and pure water can follow in order to obtain a salt-free neutral product.

The solid is obtained by evaporating off the solvent at elevated temperature, in vacuo or by spray-drying. Particularly pure products are obtained by precipitating the brominated polystyrene by mixing the reaction mixture with a turbine stirrer into a medium in which the bromo polystyrene has a low solubility. A 3-fold to 10-fold excess of methanol is particularly suitable for the precipitation. The products are separated off by filtering or centrifuging and are dried in vacuo at 50° to 100° C.

The resulting solids are white, gray or only slightly yellowish. They are virtually non-volatile and upon heating on a thermobalance (heating rate of 10° C./minute) have a loss in weight of less than 1% up to 340° C. They contain 5 to 70 wt.% of aromatically bonded bromine and less than 1 wt.% of aliphatically bonded bromine. It can be shown by H-NMR and $C^{13}$-NMR that the substitution is preferentially in the 2-position and 4-position of the styrene. In contrast to polymerization products of a defined bromostyrene monomer, which have a constant arrangement of the bromine atoms in the polymer, the substituents in the brominated polystyrenes of this invention are in random distribution.

The bromination products of the process of this invention can be used as flame-retardant additives in molding compositions and paints. For this use, products containing 40% to 60% of bromine are preferably manufactured. The products themselves can also be processed into moldings or coatings having a particularly high flame resistance. In this case, brominated polystyrenes which contain 10 to 40% of aromatically bonded bromine are preferably manufactured.

As indicated above, it was not to be expected that successful bromination could be achieved directly in polystyrenes without a hydrogenation stage, when the reaction is carried out according to this invention with modified Lewis acids and with starting materials other than those in German Auslegeschrift No. 2,537,385, i.e., of relatively high molecular weights.

Unless otherwise indicated herein, the conditions and characteristics of the process of this invention are fully conventional and are disclosed, for example in Organikum, VEB Deutscher Verlag der Wissenschaften, Berlin 1974, Pages 342–345; R.O.C. Norman, Principles of Organic Synthesis, Methuen & Co. Ltd., London, Pages 388–390, whose disclosure is incorporated by reference herein.

The FIGURE shows the thermogravimetric characteristics of two brominated polystyrenes according to this invention, compared with polystyrene. The loss in weight as a function of the temperature (heating rate 10° C./minute under nitrogen) shows that the polystyrene has suffered virtually no loss in stability as a result of the bromination according to this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

260 g of polystyrene (2.5 moles of styrene; molecular weight about 200,000, weight-average) are dissolved in 2 liters of methylene chloride (see the table for the water content). 10 g (0.075 mole) of anhydrous $AlCl_3$ are added and 820 g (5.2 moles) of bromine are added dropwise at 15° to 20° C. over the course of 4 hours. After stirring for about a further 2 hours, the catalyst and residual bromine are destroyed with dilute $Na_2S_2O_3$ solution. The organic phase is extracted by shaking several times with water and is added dropwise to about 10 liters of cold methanol, an ULTRATURRAX stirrer being used to ensure thorough mixing. The solid which has precipitated is filtered off, washed with methanol and dried in vacuo at 50° C. The following table gives the results of five experiments:

| Water content in $CH_2Cl_2$ | Absolute amount of water | $H_2O/AlCl_3$ ratio | Remarks, bromine content in the product |
|---|---|---|---|
| about 2%, saturated | 52 g ≙ 2.9 moles | 38.7 | 37% of Br |
| 500 ppm | 1.3 g ≙ 0.07 mole | 1 | 47.9% of Br |
| 200 ppm | 0.52 g ≙ 0.03 mole | 0.39 | 60.1% of Br |
| 100 ppm | 0.26 g ≙ 0.014 mole | 0.14 | Cross-linking |
| 20 ppm | 0.05 g ≙ 0.003 mole | 0.04 | Cross-linking |

The experiments show that optimum results are achieved for the bromination with $AlCl_3$ with a molar ratio of $H_2O/AlCl_3$ of 0.4 to 0.8. Cross-linking takes place with water contents of $\leq 100$ ppm ($H_2O/AlCl_3 \leq 0.2$).

EXAMPLE 2

5 kg of polystyrene (molecular weight 200,000) are dissolved in 50 kg of technical grade methylene chloride (which contains 80 ppm of water) in an enamelled 160 liter stirred kettle and 200 g of dry iron-III chloride are added to the solution at 15° C. 16 kg of bromine are added dropwise over the course of 6 hours, the temperature being maintained at 15° to 20° C. Vigorous evolution of hydrogen bromide takes place. After the addition of bromine is complete, the reaction mixture is stirred for a further 2 hours. Residual bromine and the $FeCl_3$ catalyst are destroyed by adding 5 liters of dilute $Na_2S_2O_3$ solution. The organic phase is washed three times with about 30 liters of water, once with 3% strength $NaHCO_3$ solution and twice further with water. It is then separated off and evaporated on drying trays. This gives an ochre-colored brittle solid product which can be ground to a fine yellowish powder in a mill. Yield: 11.8 kg; bromine content: 60.0%; for the thermogravimetric curve of the product, see the figure.

EXAMPLE 3

260 g of polystyrene (molecular weight 90,000) are dissolved in 350 ml of 1,1,2-trichloroethane. 13 g (0.1 mole) of $AlCl_3$ and 10 g (0.08 mole) of nitrobenzene are dissolved in a further 350 ml of 1,1,2-trichloroethane. The solutions are combined and cooled to −20° C. 400 g (2.5 moles) of bromine are added dropwise over the course of 5 hours and the reaction mixture is stirred for a further 2 hours at −20° C. Excess bromine is destroyed at 0° C. with sodium thiosulphate solution and the organic phase is washed with water until acid-free and salt-free. The solution of the brominated polystyrene is then added dropwise to 5 liters of cold methanol, with good stirring, and the white solid product is filtered off and dried in vacuo at 50° C. This gives 410 g (89% of theory) of nuclear-brominated polystyrene; bromine content 36.6%, heat stability $\leq 340°$ C. (determined by thermogravimetric analysis).

If, with an otherwise identical procedure, no nitrobenzene is added, the batch cross-links about 5 minutes after the addition of bromine is started.

EXAMPLE 4

26 g (0.025 mole) of polystyrene are dissolved in 100 ml of dry and pure methylene chloride. 1 g (7.5 mmoles) of $AlCl_3$ is dissolved in the same amount of solvent, to which the additives listed in the table have been added. 82 g (0.51 mole) of bromine are added dropwise to the combined solutions at +15° C. Working-up is carried out in accordance with Example 1.

| ADDITIVE | PRODUCT |
| --- | --- |
| 0.5 g of methanol (15 mmoles) | Pale beige solid, 45% of Br |
| 1.8 g of nitrobenzene (15 mmoles) | Pale beige solid, 59% of Br |
| 0.9 g of acetic acid (15 mmoles) | Pale beige solid, 48% of Br |
| 0.13 g of ammonia (7.5 mmoles) | Pale beige solid, 42.5% of Br |
| No additive | Cross-linking! |

EXAMPLE 5

104 g of polystyrene (molecular weight 250,000) are dissolved in 800 ml of methylene chloride with a water content of 40 ppm (42 mg of $H_2O \triangleq 2.4$ mmoles). 8 g (49 mmoles) of iron-III chloride are added. The catalyst dissolved within a short time. The mixture is cooled to 0° to 5° C. and 320 g (2 moles) of bromine are added dropwise. After 2 hours, the absorption of bromine has ended. The organic phase is washed with dilute hydrochloric acid, twice with water, once with sodium bicarbonate solution and again with water. Working-up is as in Example 1. Yield: 240 g of a white solid product (91% of theory, bromine content 60.5%).

If 8 g of antimony-V chloride are used in place of the iron-III chloride, an otherwise identical procedure gives a product which has a bromine content of 43.5%.

EXAMPLE 6

26 g of polystyrene (molecular weight 250,000) are dissolved in 200 ml of chloroform with a water content of 25 ppm and an ethanol content of 1%. 1 g of $AlCl_3$ is added and the mixture is brominated at 20° C. by adding 41 g of liquid bromine, dropwise. After a reaction time of 4 hours, excess bromine is destroyed by $Na_2S_2O_3$ solution, the mixture is washed several times with water and the organic phase is concentrated to dryness. The brittle solid product can be comminuted in a mortar to a pale yellow powder. It contains 39.2% of bromine.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the manufacture of a heatstable, nuclear-brominated polystyrene comprising brominating, at −20° C. to +40° C., a polystyrene dissolved in a chlorinated hydrocarbon in the presence of a Lewis acid catalyst, and 0.02 to 2 moles, per mole of Lewis acid, of a nucleophilic substance which acts as a Lewis base for the Lewis acid, the amount of Lewis base being selected within this range such that the polystyrene is essentially not crosslinked during bromination.

2. The process of claim 1, wherein the nucleophilic substance is added to the chlorinated hydrocarbon before the reaction is carried out.

3. The process of claim 1, wherein the polystyrene has a molecular weight of greater than 8,000 (weight-average).

4. The process of claim 3, wherein the polystyrene has a molecular weight of 50,000 to 500,000 (weight-average).

5. The process of claim 1, wherein the polystyrene is homopolystyrene.

6. The process of claim 1, wherein the Lewis acid is aluminum-III chloride and the nucleophilic substance is 0.4 to 0.8 mole of water per mole of aluminum-III chloride.

7. The process of claim 1, wherein the Lewis acid is iron-III chloride and the nucleophilic substance is 0.05 to 0.2 mole of water per mole of iron-III chloride.

* * * * *

REEXAMINATION CERTIFICATE (725th)

United States Patent [19]

Diebel et al.

[11] B1 4,200,703

[45] Certificate Issued  Jul. 14, 1987

[54] PROCESS FOR THE MANUFACTURE OF HEAT-STABLE, NUCLEAR-BROMINATED POLYSTYRENES

[75] Inventors: Klaus Diebel; Horst-Dieter Wulf; Raban Grundmann; Gunther Maahs, all of Marl, Fed. Rep. of Germany

[73] Assignee: Chemische Werke Huls A.G., Marl, Fed. Rep. of Germany

Reexamination Request:
No. 90/001,036, Jun. 20, 1986

Reexamination Certificate for:
Patent No.: 4,200,703
Issued: Apr. 29, 1980
Appl. No.: 617
Filed: Jan. 2, 1979

[30] Foreign Application Priority Data

Jan. 2, 1978 [DE] Fed. Rep. of Germany ....... 2800012
Jan. 2, 1978 [DE] Fed. Rep. of Germany ....... 2800013

[51] Int. Cl.[4] ............................. C08F 8/20; C08F 8/22
[52] U.S. Cl. ................................. 525/340; 525/333.4; 525/344; 525/354; 525/356; 525/357; 525/358
[58] Field of Search .................... 525/333.4, 337, 340, 525/344, 354, 356-358

[56] References Cited

U.S. PATENT DOCUMENTS 1,890,772 12/1932 Dykstra ........................... 525/333.4
3,932,542 1/1976 Gerns ............................... 260/650 R
4,074,032 2/1978 Naarmann et al. .................. 526/44
4,143,221 3/1979 Naarmann et al. .................. 526/44

FOREIGN PATENT DOCUMENTS 2651435 5/1978 Fed. Rep. of Germany .
364873 4/1932 United Kingdom .
953484 3/1964 United Kingdom .

OTHER PUBLICATIONS

Engel et al., "Molecular Weight Jump Reaction", *Rubber Age*, Dec. 1964, pp. 410–415.
Olah, George A., *Friedel-Crafts and Related Reactions*, 1963; pp. 28, 29, 126–128, 206, 242, 243, 283–291, 859, 874–877.
H. van den Berg and R. M. Westorink, *Ind. Eng. Chem., Fundam*, vol. 15, No. 3, 1976.
P. H. Groggins, *Unit Processes in Organic Synthesis*, McGraw-Hill Book Co., Inc., N.Y. (1958), p. 235.
C.A. 87:39074 (1977).
G. A. Olah et al., *J. Am. Chem. Soc. 86*, 1055 (1964).
C.A. 68:78928 (1968).

*Primary Examiner*—Edward J. Smith

[57] ABSTRACT

In a process for the manufacture of a heat-stable, nuclear-brominated polystyrene by brominating, at −20° C. to +40° C., a polystyrene dissolved in a chlorinated hydrocarbon in the presence of a Lewis acid catalyst, an improvement is provided wherein the catalyst further comprises 0.02 to 2 moles, per mole of Lewis acid, of a nucleophilic substance which acts as a Lewis base for the Lewis acid.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7 is confirmed.

New claims 8–18 are added and determined to be patentable.

8. *The process of claim 1, wherein the nucleophilic substance is water.*

9. *The process of claim 4, wherein the nucleophilic substance is water.*

10. *The process of claim 8, wherein the polystyrene is homopolystyrene of a molecular weight 50,000 to 500,000 (weight average).*

11. *The process of claim 1, wherein the Lewis acid catalyst is $AlCl_3$, $AlBr_3$, $FeCl_3$, $FeBr_3$, Fe, $SbCl_5$, $BF_3$, $TiCl_4$, $SnCl_4$, $ZnCl_2$, $CaBr_2$, CuBr or $I_2$.*

12. *The process of claim 1, wherein the nucleophilic substance is $H_2O$, $H_2S$, $NH_3$, $PCL_3$, $PBr_3$, $SO_2$ or $SCl_4$.*

13. *The process of claim 1, wherein the nucleophilic substance is an organic compound having a free electron pair effective for it to act as said Lewis base for said Lewis acid catalyst.*

14. *The process of claim 8, wherein the temperature is $10°–20°$ C.*

15. *The process of claim 8, wherein the amount of nucleophilic substance is 0.05 to 1 mole.*

16. *The process of claim 1, wherein the bromine content in said polystyrene is 5–70% of aromatically bonded bromine.*

17. *The process of claim 1, wherein the bromine content in said polystyrene is 40–60% of aromatically bonded bromine.*

18. *The process of claim 1, wherein the bromine content in said polystyrene is 10–40% of aromatically bonded bromine.*

* * * * *